(12) United States Patent
Kotani et al.

(10) Patent No.: US 8,993,107 B2
(45) Date of Patent: Mar. 31, 2015

(54) POROUS GLASS AND OPTICAL MEMBER

(75) Inventors: Yoshinori Kotani, Yokohama (JP); Zuyi Zhang, Yokohama (JP); Kenji Takashima, Tokyo (JP); Akira Sugiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 6 days.

(21) Appl. No.: 13/819,272

(22) PCT Filed: Aug. 25, 2011

(86) PCT No.: PCT/JP2011/004725
§ 371 (c)(1),
(2), (4) Date: Feb. 26, 2013

(87) PCT Pub. No.: WO2012/029261
PCT Pub. Date: Mar. 8, 2012

(65) Prior Publication Data
US 2013/0157026 A1 Jun. 20, 2013

(30) Foreign Application Priority Data

Aug. 31, 2010 (JP) ................................. 2010-193215
Jul. 23, 2011 (JP) ................................. 2011-161447

(51) Int. Cl.
| | | |
|---|---|---|
| C03C 11/00 | (2006.01) | |
| C03C 3/091 | (2006.01) | |
| C03C 17/00 | (2006.01) | |
| B32B 3/26 | (2006.01) | |
| B32B 7/02 | (2006.01) | |

(52) U.S. Cl.
CPC .............. *C03C 11/005* (2013.01); *C03C 3/091* (2013.01); *C03C 17/006* (2013.01); *B32B 3/26* (2013.01); *B32B 7/02* (2013.01); *C03C 2217/425* (2013.01); *C03C 2217/732* (2013.01); *C03C 2217/91* (2013.01)
USPC ........................................ 428/215; 428/312.6

(58) Field of Classification Search
CPC ............................. C03C 11/00; C03C 11/005
USPC ....................................................... 428/312.6
See application file for complete search history.

(56) References Cited

U.S. PATENT DOCUMENTS

| | | | |
|---|---|---|---|
| 2,480,672 A | 8/1949 | Plank | |
| 3,843,341 A | 10/1974 | Hammel | |

(Continued)

FOREIGN PATENT DOCUMENTS

| | | |
|---|---|---|
| JP | 60-45137 B | 10/1985 |
| JP | 3-115139 | 5/1991 |

(Continued)

OTHER PUBLICATIONS

JP2003246646.pdf, English Translation.*

(Continued)

*Primary Examiner* — Aaron Austin
*Assistant Examiner* — Jasper Saberi
(74) *Attorney, Agent, or Firm* — Canon U.S.A. Inc., IP Division

(57) ABSTRACT

The present invention provides a porous glass having excellent antireflection performance for visible light.
A porous glass includes a porous layer which is mainly composed of silica and which has pores attributed to spinodal phase separation and pores attributed to binodal phase separation.

15 Claims, 9 Drawing Sheets

(56) References Cited

U.S. PATENT DOCUMENTS

| | | | |
|---|---|---|---|
| 4,080,188 A * | 3/1978 | Doddato et al. | 65/31 |
| 4,091,793 A * | 5/1978 | Hermann et al. | 126/648 |
| 2007/0184247 A1 | 8/2007 | Simpson | |
| 2008/0026188 A1 | 1/2008 | D Urso | |

FOREIGN PATENT DOCUMENTS

| | | |
|---|---|---|
| JP | 2002-160941 A | 6/2002 |
| JP | 2003246646 A * | 9/2003 |
| WO | WO2008/106038 A1 | 9/2008 |

OTHER PUBLICATIONS

Alexander Flugel et al., Graded pore size by ion exchange of phase-separated, Glastech. Ber. Glass Sci. Technol. 73 (2000) No. 7, 204-210.
Werner Vogel, Microphase separation, Glass Chemistry, 3rd ed., ISBN 0-387-57572-3, 22 pgs.
Jiang, Zhonghong, Some aspect of phase separation in glasses, Journal of Non-Crystalline Solids 112 (1989), 48-57.
M. J. Minot, J., Single-layer, gradient refractive index antireflection films effective from 0.35 to 205μ, J. Opt. Soc. Am., vol. 66, No. 6, 1976, pp. 515-519.

* cited by examiner

POROUS GLASS AND OPTICAL MEMBER

TECHNICAL FIELD

The present invention relates to a porous glass and an optical member, such as an optical lens for use in image pick-up systems, observation systems, projection systems, and scanning optical systems, and a polarizer for use in display apparatuses, including the porous glass.

BACKGROUND ART

Porous glass produced utilizing the phase-separation phenomenon of glass should be industrially used for optical members having various optical functions, such as antireflection.

In general, a porous glass utilizing the phase-separation phenomenon of glass is produced by subjecting a borosilicate glass having a composition that can be phase-separated to heat treatment at 500 to 700 degrees (Celsius) to cause phase separation and performing etching to form pores. PTL 1 discloses that a porous surface layer of glass is formed by controlling etching conditions, providing an antireflective surface layer. NPL 1 discloses that the control of detailed etching conditions results in a porous layer having a gradient-index structure determined from reflectance characteristics of the porous layer formed on a surface of glass. PTL 2 discloses a porous glass film having a two-layer structure, the two layers having different average pore sizes. The porous glass film in which the pore size of an upper layer is smaller than that of a lower layer is produced by stacking glass layers having different phase-separation rates, forming the stack into a shape, firing the stack, and etching the stack with an acid. PTL 3 discloses a porous antireflection film formed by etching a film composed of two or more substances.

It is known that the formation of a subwavelength structure is commonly used as a method for achieving good antireflection performance. For example, in the case where an ideal film having a subwavelength structure is formed on a base (letting the refractive index of the base be equal to that of the film), suppose that the film is divided into layers, the space occupancy of the layers is continuously changed from 0% to 100% at greater distances from air toward the base. The effective refractive index is continuously changed from the refractive index of air to the refractive index of the base. This significantly reduces reflection at interfaces between the layers, thereby achieving antireflection performance having good wavelength-band characteristics and incident-angle characteristics.

PTL 1 and NPL 1 each report that the porous surface layer of glass is formed to provide the antireflective surface layer. However, the formation of the antireflective surface layer depends on an etching process of a phase-separated leached phase. So, the formation of the layer is limited to the etching conditions. The conditions of the etching process which can be selected are narrow. In addition, it is difficult to strictly control the etching process. Accordingly, the control range of the layer formation is limited, and the degree of flexibility in the resulting gradient-index structure is low. So, the subwavelength structure is not sufficient. It is thus difficult to achieve excellent antireflection performance.

In the case of the porous glass film having the two-layer structure disclosed in PTL 2, the two layers having different average pore sizes, the structure is not continuous; hence, the porous glass film is not suitable as an antireflective component. In the case of the porous antireflection film formed by the selective etching of a film composed of two or more substances disclosed in PTL 3, the resulting porous structure significantly depends on the etching conditions as described above. This limits the control of the structure. Thus, the porous antireflection film is not satisfactory as an antireflective component.

As described above, in the related art, the formation of an antireflective layer significantly depends on an etching process, thus leading to a low degree of flexibility in the formation of an excellent antireflective structure. There is no literature on the production of a porous glass having excellent antireflection performance by widely controlling a porous structure.

CITATION LIST

Patent Literature

PTL 1: Japanese Patent Publication No. 60-45137
PTL 2: Japanese Patent Laid-Open No. 2002-160941
PTL 3: Japanese Patent Laid-Open No. 3-115139

Non Patent Literature

NPL 1: M. J. Minot, J. Opt. Soc. Am., Vol. 66, No. 6, 1976.

SUMMARY OF INVENTION

Technical Problem

As described above, in the case of the production of a porous glass utilizing phase-separation phenomenon, a skeleton structure, which is a phase that is not leached, is uniform in the related art. So, in order to control the spatial structure of the porous glass, it is necessary to control the etching state of a phase to be leached. It is thus difficult to strictly control leaching. Furthermore, the control range of the porous structure is narrow and is not adequate.

Aspects of the present invention provide a porous glass having excellent antireflection performance for visible light.

Solution to Problem

To overcome the foregoing problems, according to one aspect of the present invention, a porous glass includes a porous layer which includes silica and which has pores attributed to spinodal phase separation and pores attributed to binodal phase separation.

Advantageous Effects of Invention

Aspects of the present invention provide a porous glass having excellent antireflection performance for visible light.

DESCRIPTION OF EMBODIMENTS

Figure 1:
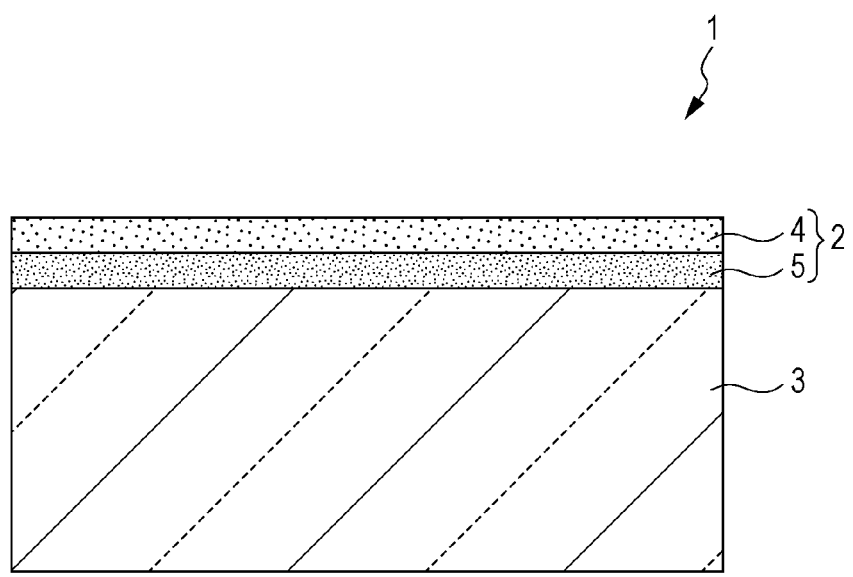
FIG. 1 is a schematic view of a porous glass according to an embodiment of the present invention.

A porous glass according to an embodiment of the present invention will be described in detail below.

A common method for producing a porous glass utilizing the phase-separation phenomenon of glass will be described.

A glass body serving as a matrix of a porous glass according to aspects of the present invention contains silicon oxide, boron oxide, and an alkali metal oxide. Examples of the matrix glass according to aspects of the present invention include, but are not particularly limited to, silicon oxide-based glass I (glass matrix composition: silicon oxide-boron oxide-alkali metal oxide), silicon oxide-based glass II (glass matrix composition: silicon oxide-boron oxide-alkali metal oxide-(at least one of alkaline-earth metal oxides, zinc oxide, aluminum oxide, and zirconium oxide)), silicon oxide-based glass III (glass matrix composition: silicon oxide-phosphate-alkali metal oxide), and a titanium oxide-based glass (glass matrix composition: silicon oxide-boron oxide-calcium oxide-magnesium oxide-aluminum oxide-titanium oxide). Among these glass bodies, a borosilicate-based glass that belongs to silicon oxide-based glass I can be used as a glass body. The borosilicate-based glass preferably has a silicon oxide content of 45% by weight to 80% by weight, more preferably 50% by weight to 80% by weight, still more preferably 55% by weight to 80% by weight, and optimally 60% by weight to 80% by weight. The glass body has a phase-separation property. The term "phase-separation property" indicates a property in which when the glass body is, for example, a borosilicate-based glass (silicon oxide-boron oxide-alkali metal oxide), the glass is subjected to phase separation in the glass by heat treatment to form a silicon oxide-rich phase and an alkali metal oxide-boron oxide-rich phase.

A method for producing the glass body may be the same as a known method, except that raw materials are used so as to achieve the foregoing composition. For example, a raw material containing constituent sources is melted by heating and formed into a desired shape, as needed, thereby producing the glass body. The heating temperature at the time of melting by heating may be appropriately determined, depending on the raw material composition and so forth. The heating temperature can be usually in the range of 1350 degrees (Celsius) to 1450 degrees (Celsius) (and particularly 1380 degrees (Celsius) to 1430 degrees (Celsius)).

For example, sodium carbonate, boric acid, and silicon dioxide, which are used as the foregoing raw materials, are uniformly mixed. The mixture may be melted by heating to 1350 degrees (Celsius) to 1450 degrees (Celsius). In this case, any raw material may be used as long as it contains an alkali metal oxide, boron oxide, or silicon oxide as described above.

In the case where a porous glass is formed into a predetermined shape, after the preparation of the matrix glass, the glass may be formed into any shape, for example, a tube, a plate, or a sphere, at about 1000 degrees (Celsius) to about 1200 degrees (Celsius). For example, a method can be employed in which after the foregoing raw materials are melted to prepare a glass body, the temperature is decreased from the melting temperature to 1000 degrees (Celsius) to 1200 degrees (Celsius), and the glass is formed into a shape with the temperature maintained.

In general, the glass body can be subjected to heat treatment to undergo phase separation. The heat-treatment temperature for the phase separation may be appropriately set in the range of 400 degrees (Celsius) to 800 degrees (Celsius), and the heat-treatment time may be appropriately set in the range of 20 hours to 100 hours, depending on, for example, the pore size of the resulting porous glass. In the case of a borosilicate-based glass having a silicon oxide content of 45% by weight to 80% by weight, the heat-treatment temperature can be in the range of 500 degrees (Celsius) to 800 degrees (Celsius). In the case of a borosilicate-based glass having a silicon oxide content of 50% by weight to 80% by weight, the heat-treatment temperature can be in the range of 500 degrees (Celsius) to 750 degrees (Celsius). In the case of a borosilicate-based glass having a silicon oxide content of 55% by weight to 80% by weight, the heat-treatment temperature can be in the range of 550 degrees (Celsius) to 700 degrees (Celsius).

The phase-separated glass prepared in the heat-treatment step is brought into contact with an acid solution to dissolve and remove the alkali metal oxide-boron oxide-rich phase, which is an acid-soluble component. Examples of the acid solution that can be used include solutions of inorganic acids, such as hydrochloric acid and nitric acid. The acid solution can be used in the form of an aqueous solution whose solvent is water. Usually, the concentration of the acid solution may be appropriately set in the range of 0.1 to 2 mol/L (0.1 to 2 N). In this acid-treatment step, the temperature of the solution may be set in the range of room temperature to 100 degrees (Celsius). The treatment time may be set in the range of about 1 to about 50 hours. Then rinse treatment with water is performed to provide a porous glass having a silicon oxide skeleton. Note that silicon oxide, boron oxide, or alkali metal oxide can be left in the porous glass. The temperature of the rinse water in the rinse treatment step with water may be commonly set in the range of room temperature to 100 degrees (Celsius). The time of the rinse treatment step with water may be appropriately determined, depending on, for example, the composition and size of a target glass. Usually, the time of the rinse treatment step with water may be in the range of about 1 to about 50 hours.

Figure 6:
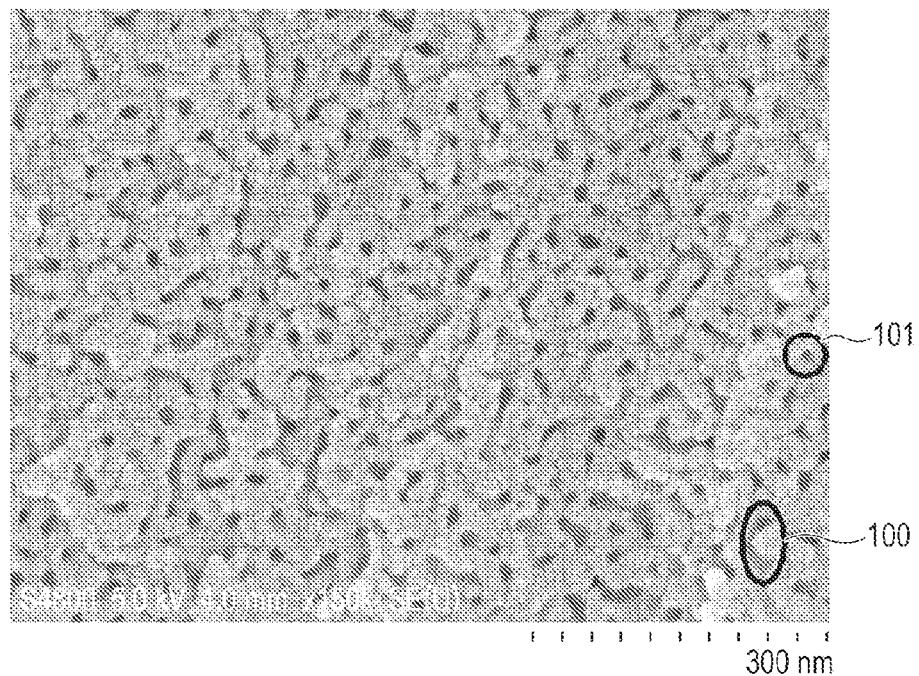
FIG. 6 is an explanatory drawing illustrating pores attributed to spinodal phase separation and pores attributed to binodal phase separation.

There are spinodal and binodal mechanisms of phase separation. FIG. 6 is a cross-sectional view of a porous layer on a surface of a porous glass according to aspects of the present invention. Examples of pores formed by spinodal phase separation include a pore having an arcuate cross section like a portion surrounded by a closed curve 100 illustrated in FIG. 6; and a pore having an elliptic cross section, the pores being interconnected open pores each having substantially the same pore size from a surface to an inner portion. More specifically, the porous glass obtained by spinodal phase separation has an ant-nest-like structure in which pores are three-dimensionally entangled, the silicon oxide skeleton corresponding to a nest, and the interconnected pores corresponding to holes.

Meanwhile, an example of pores formed by binodal phase separation is a pore having a substantially spherical cross section like a portion surrounded by a closed curve 101 illustrated in FIG. 6. An acid-soluble component can be left in the pores attributed to binodal phase separation to fill the space of the pores, in some cases. These pores can be distinguished by morphological observation with an electron microscope. Furthermore, even if the space of a pore is filled with the acid-soluble component, whether the pore has a structure attributed to binodal phase separation or a structure attributed to spinodal phase separation can be distinguished by the fact that the shape of the acid-soluble component can be determined from the shape of the phase (phase other than a silicon oxide-rich phase) of the acid-soluble component after phase separation. Pores attributed to binodal phase separation may be connected to each other through a tubular pore having a pore size smaller than those of the pores.

A pore attributed to binodal phase separation may be connected to a pore attributed to spinodal phase separation through a tubular pore having a pore size smaller than those of the pores.

Hereinafter, a pore attributed to spinodal phase separation is also referred to as a "spinodal pore", and a pore attributed to binodal phase separation is also referred to as a "binodal pore".

Figure 7:
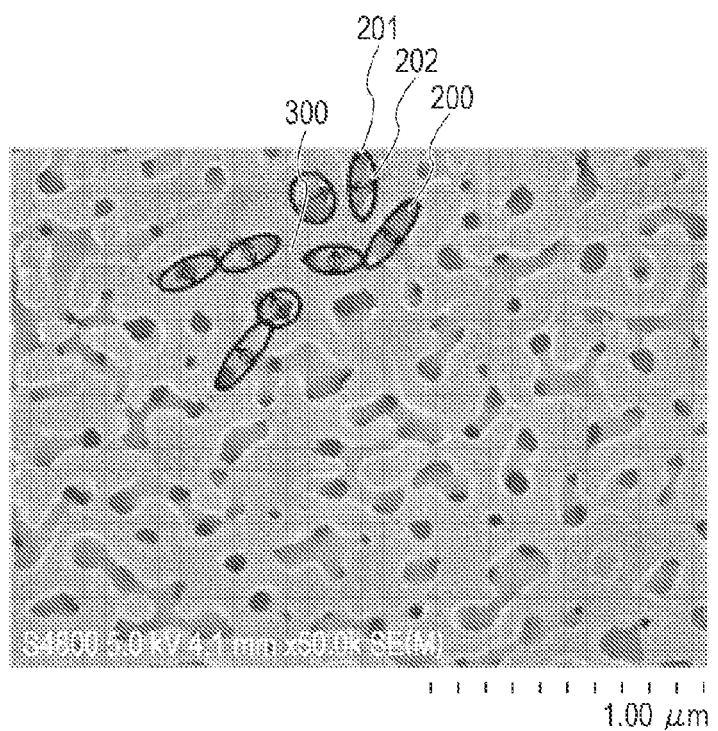
FIG. 7 is an explanatory drawing illustrating an average pore size.

The average pore size of the porous glass is preferably, but not particularly limited to, in the range of 1 nm (0.001 micrometers) to 1 micrometer, more preferably 2 nm (0.002 micrometers) to 0.5 micrometers, and still more preferably 10 nm to 100 nm. The average pore size according to aspects of the present invention is defined as follows: when pores on a surface of the porous glass are approximated by a plurality of ellipses, the average value of minor axes of the approximate ellipses is the average pore size. Specifically, for example, as illustrated in FIG. 7, an electron micrograph of a surface of the porous glass is used. Pores 200 are approximated by a plurality of ellipses 201. The average value of minor axes 202 of the ellipses is calculated to determine the average pore size. At least 30 pores or more are measured, and the average value is determined. Note that the average pore size of the porous glass is the average of pores on a surface of the porous glass, the pores being not limited to spinodal pores and binodal pores. In FIG. 7, reference numeral 300 denotes the skeleton of silicon oxide. The porous glass usually has a porosity of 10% to 90% and particularly 20% to 80%.

As described above, in the traditional method for producing a porous glass using the phase-separation phenomenon of glass, either spinodal phase separation or binodal phase separation occurs, thereby resulting in a porous glass with a spinodal pore structure or a binodal pore structure as a whole. Spinodal phase separation and binodal phase separation are described in, for example, Introduction to Ceramics, second edition, John Wiley & Sons, Chapter 8, 1960.

FIG. 1 is a schematic view of a porous glass according to an embodiment of the present invention. In FIG. 1, a porous glass 1 according to aspects of the present invention includes a porous layer 2 on a matrix layer 3, the porous layer 2 containing silica as a main component and having spinodal pores and binodal pores. The main component in the porous layer indicates a component having the highest proportion in the porous layer. The porous layer 2 includes an upper portion 4 where the spinodal pores are mainly present and a lower portion 5 where the binodal pores are mainly present. More specifically, the proportion of the spinodal pores with respect to the proportion of the binodal pores is reduced with increasing distance from a surface toward the inside of the porous layer 2. The proportion of the spinodal pores (or the binodal pores) indicates the proportion of the number of the spinodal pores (or the binodal pores) with respect to the sum of the number of the spinodal pores and the binodal pores determined by the use of an electron micrograph of a surface of the porous glass. The term "mainly" is used to indicate that one of the proportion of the spinodal pores and the proportion of the binodal pores is larger than the other.

The spinodal pores are attributed to the spinodal phase separation. The binodal pores are attributed to the binodal phase separation. The porous layer 2 contains both the spinodal pores and the binodal pores. These pores are formed by performing a step of immersing a matrix glass in water before the heat treatment for phase separation. That is, the matrix glass is immersed in water before the heat treatment. Then the matrix glass is subjected to heat treatment for phase separation, followed by acid treatment and rinsing with water to provide the porous glass.

Figure 5:
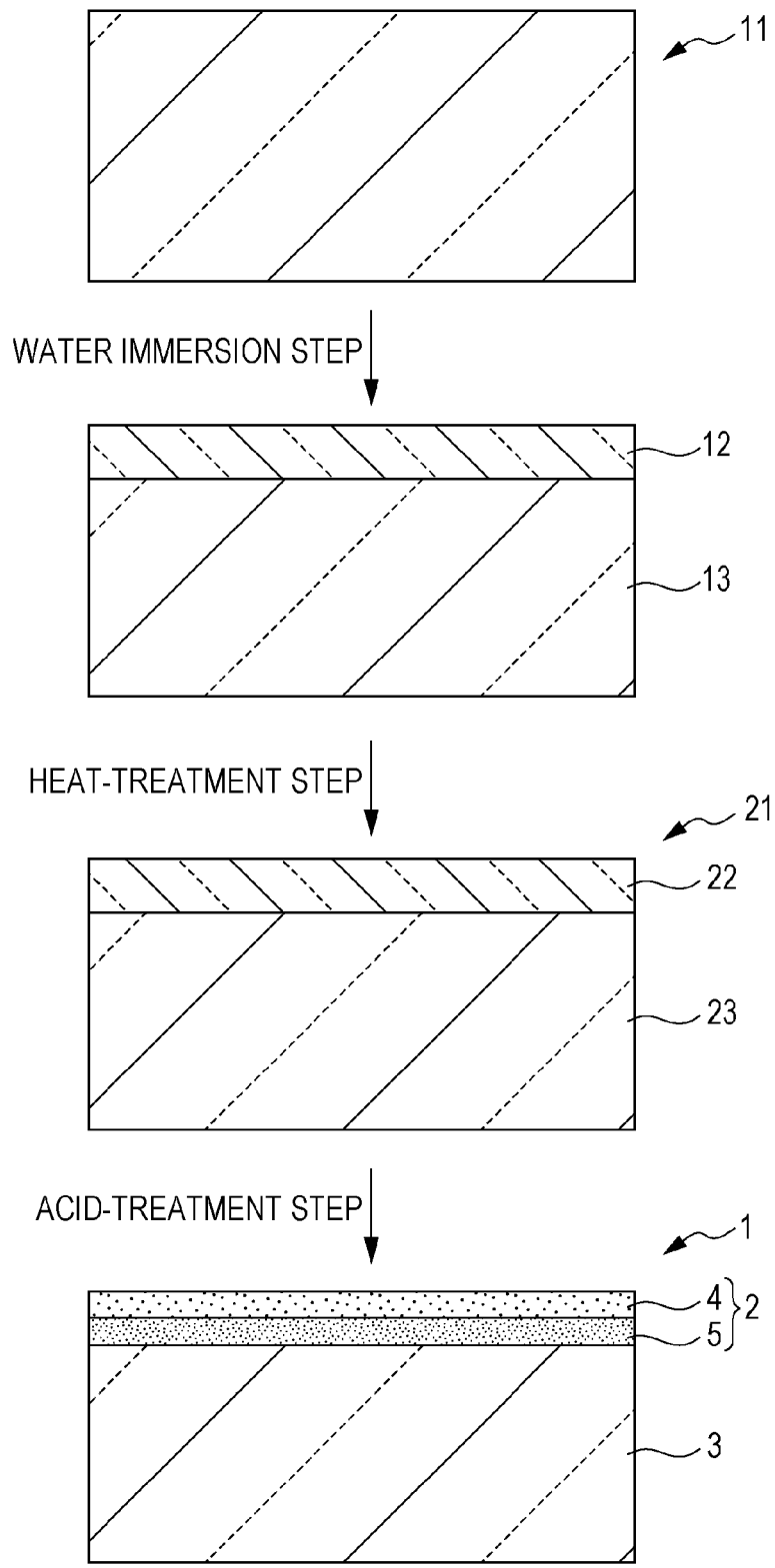
FIG. 5 is a schematic view of a method for producing a porous glass according to an embodiment of the present invention.

The mechanism for the presence of both spinodal pores and binodal pores in the porous layer 2 is not clear but is speculated as follows: FIG. 5 illustrates a method for producing a porous glass according to an embodiment of the present invention. The immersion of a matrix glass 11 in water can cause the leaching of boron and an alkali metal component, which are components contained in glass, from a surface portion 12 of the matrix glass 11 into water and can cause the diffusion of components in the surface portion 12. So, after the water immersion step, the composition of the surface portion 12 of the matrix glass 11 is different from that of an inner portion 13 of the matrix glass 11. Furthermore, the surface portion 12 of the matrix glass 11 can have a composition gradient. The matrix glass 11 is subjected to heat treatment after the water immersion step to provide a phase-separated glass 21. It is speculated that in the case of the phase-separated structure, the composition of a surface layer 22 of the phase-separated glass 21 corresponding to the surface portion 12 of the matrix glass 11 is also different from that of an inner portion 23 of the phase-separated glass 21 corresponding to the inner portion 13 of the matrix glass 11. Furthermore, it is speculated that in the surface layer 22 of the phase-separated glass 21, the phase-separated structure changes with increasing distance from the surface because of the effect of the composition gradient of the matrix glass.

After the phase separation, the phase-separated glass 21 is subjected to acid treatment to provide the porous glass 1. In this way, the spinodal pores attributed to the spinodal phase separation structure and the binodal pores attributed to the binodal phase separation structure are formed in the porous layer 2 of the porous glass 1. The porous layer 2 includes the upper portion 4 where the spinodal pores are mainly present and the lower portion 5 where the binodal pores are mainly present. More specifically, the proportion of the spinodal pores with respect to the proportion of the binodal pores is reduced with increasing distance from the surface toward the inside of the porous layer 2.

As described above, the introduction of the water immersion step into a process of the related art results in the formation of the porous structure including the spinodal pores and the binodal pores and enables us to widely control the formation of the porous structure, thereby increasing the degree of flexibility in a gradient-index structure. Furthermore, the porous glass 1 with the porous structure has antireflection performance.

The porous glass 1 according to aspects of the present invention has a thickness of 500 micrometers to 2000 micrometers. The surface layer of the porous glass according to aspects of the present invention has a thickness of 10 nm (0.01 micrometers) to 100 micrometers and preferably 30 nm (0.03 micrometers) to 80 micrometers.

In the matrix layer 3 on which the porous layer 2 composed of the porous glass according to aspects of the present invention is provided, the binodal pores are not present, but only the spinodal pores are present. The spinodal pores in the matrix layer 3 contain boron oxide and an alkali metal oxide, which is a component of the matrix glass, in some cases. This is presumably because boron oxide and the alkali metal oxide in the matrix layer 3 located in the porous glass 1 are not sufficiently leached during the acid treatment, so that they are left in the matrix layer 3.

The method for producing a porous glass according to aspects of the present invention includes the steps of immersing the matrix glass in water, performing the heat treatment, and performing the acid treatment. According to aspects of the present invention, in the step of immersing the matrix glass in water, the pH of the water used may be in the range of slightly acidic to slightly alkaline pH values. Specifically, the water can have a pH of 5.0 to 9.0. The temperature of the water used for the immersion of the matrix glass may be set in the range of 30 degrees (Celsius) to 95 degrees (Celsius). The treatment time may be set in the range of about 1 to about 50 hours. In the case of a borosilicate glass having a silicon oxide content of 45% by weight to 80% by weight, water having a pH of 5.5 to 8.5 can be used. In the case of a borosilicate glass having a silicon oxide content of 50% by weight to 80% by weight, water having a pH of 6.0 to 8.5 can be used. In the case of a borosilicate glass having a silicon oxide content of 55% by weight to 80% by weight, water having a pH of 6.5 to 8.0 can be used.

In the heat treatment step after immersion in water, similarly to the related art, the heat-treatment temperature may be appropriately set in the range of 400 degrees (Celsius) to 800 degrees (Celsius). The heat-treatment time may be appropriately set in the range of 20 hours to 100 hours. In the acid-treatment step, similarly to the related art, a solution of an inorganic acid may be used as an acid solution. The concentration of the acid solution may be usually set in the range of 0.1 to 2 mol/L (0.1 to 2 N). The temperature of the solution may be set in the range of room temperature to 100 degrees (Celsius). The treatment time may be set in the range of about 1 to about 50 hours. The subsequent rinse treatment step with water may be performed as in the related art.

The method for producing a porous glass according to aspects of the present invention may include the heat-treatment step after the immersion of the matrix glass in water. The acid-treatment step is not always performed. The reason for this is as follows: Sings of pore formation are observed even before the acid treatment. It is thus speculated that the water immersion step and/or the heat-treatment step for phase separation after the water immersion step significantly affect the pore formation. So, if target optical performance is achieved using the structure of a phase-separated glass obtained by the heat treatment after the immersion of the matrix glass in water, the acid-treatment step may not be needed.

Examples of the shape of the porous glass include, but are not particularly limited to, tube- and plate-like shapes. The shape may be appropriately selected, depending on, for example, applications of the porous glass. Furthermore, the porous glass according to aspects of the present invention may be formed on a base. That is, a structure in which a matrix glass layer and a porous layer are laminated on a base may be used. Alternatively, a structure in which a porous layer is laminated on a base may be used.

An optical member according to aspects of the present invention includes the porous glass described above. The porous structure of the porous glass according to aspects of the present invention can be widely controlled. So, the optical member holds promise as an optical member, such as an optical lens for use in image pick-up systems, observation systems, projection systems, and scanning optical systems, and a polarizer for use in display apparatuses, including the porous glass.

EXAMPLES

The present invention will be specifically described below by examples. However, the present invention is not limited to these examples.

Porous glasses prepared in examples and comparative examples were evaluated by methods described below.

(1) Surface Observation

Surface observation of a porous glass was performed with a scanning electron microscope (FE-SEM, Model S-4800, manufactured by Hitachi, Ltd.) at an acceleration voltage of 5 kV and a magnification of 50,000 times.

(2) Determination of Glass Composition

A glass composition was determined by X-ray photoelectron spectroscopy (XPS). Measurement by XPS was performed with an ESCA LAB220i-XL spectrometer.

(3) Measurement of Reflectance

The reflectance of a porous glass was measured with a reflectometer for lenses (USPM-RU, manufactured by Olympus Corporation).

Example 1

Sodium carbonate, boric acid, silicon dioxide, and alumina were used as glass raw materials. These raw materials were uniformly mixed in such a manner that the ratio of $Na_2O$, $B_2O_3$, $SiO_2$, and $Al_2O_3$ was 4.5:19:75:1.5 (% by weight). The mixture was melted by heating to 1350 to 1450 degrees (Celsius), formed into a plate-like shape, and left to cool with the plate-like shape maintained, thereby producing a glass plate having a thickness of about 1 mm.

The resulting glass plate was cut into square pieces each measuring about 1 cm by 1 cm, which served as a matrix glass. The matrix glass with a composition of $4.5Na_2O$-$19B_2O_3$-$75SiO_2$-$1.5Al_2O_3$ (% by weight) was immersed in deionized water (neutral, pH=6.9) having a temperature of 80 degrees (Celsius) for 3 hours. Then the matrix glass was subjected to heat treatment at 600 degrees (Celsius) for 50 hours. The resulting matrix glass was immersed in a 1 mol/L (1 N) aqueous nitric acid solution having a temperature of 80 degrees (Celsius) for 24 hours and then immersed in deionized water having a temperature of 80 degrees (Celsius) for 24 hours.

Figure 2A:
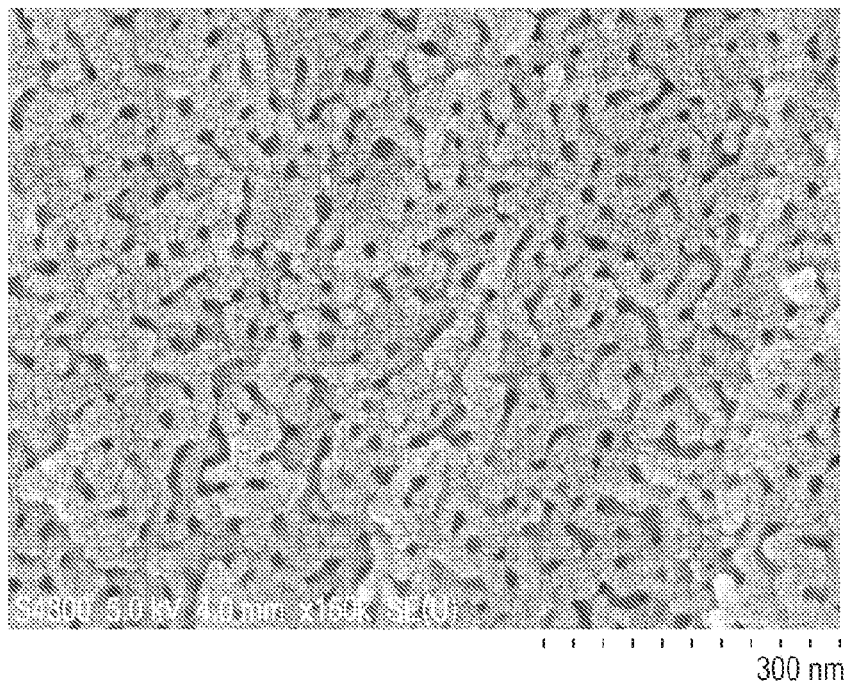
FIG. 2A is an electron micrograph of a cross section (of a portion located at a depth of 1 micrometer from a surface) of a porous glass prepared in EXAMPLE 1.
Figure 2B:
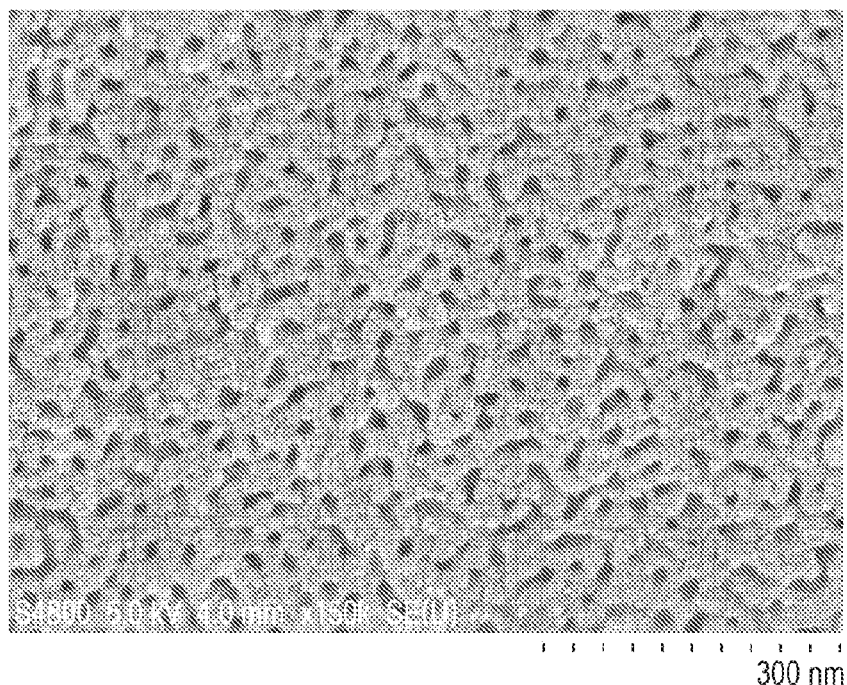
FIG. 2B is an electron micrograph of a cross section (of a portion 5 micrometers from the surface) of the porous glass prepared in EXAMPLE 1.
Figure 2C:
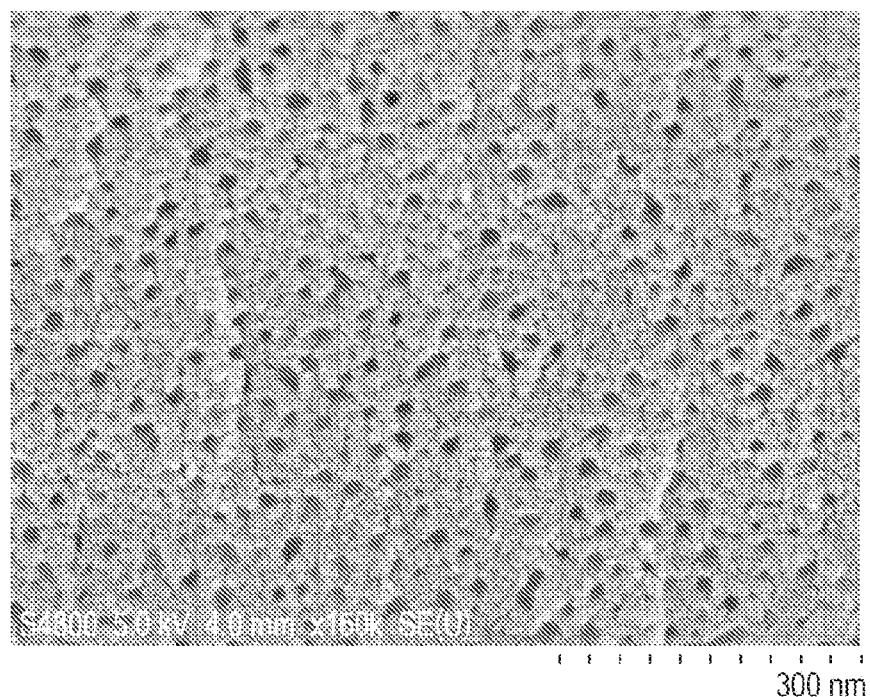
FIG. 2C is an electron micrograph of a cross section (of a portion located at a depth of 20 micrometers from the surface) of the porous glass prepared in EXAMPLE 1.
Figure 2D:
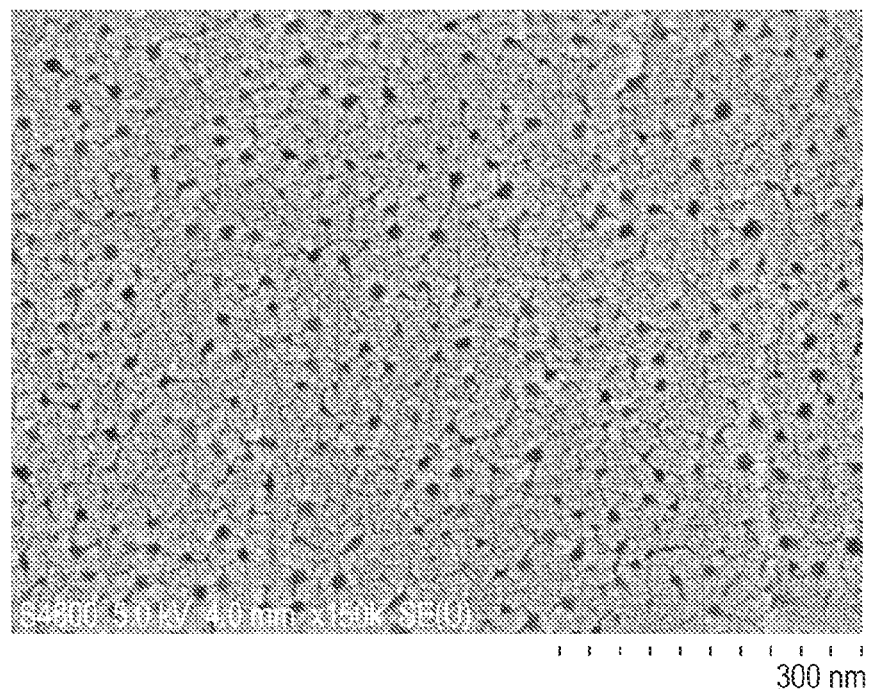
FIG. 2D is an electron micrograph of a cross section (of a portion located at a depth of 30 micrometers from the surface) of the porous glass prepared in EXAMPLE 1.
Figure 2E:
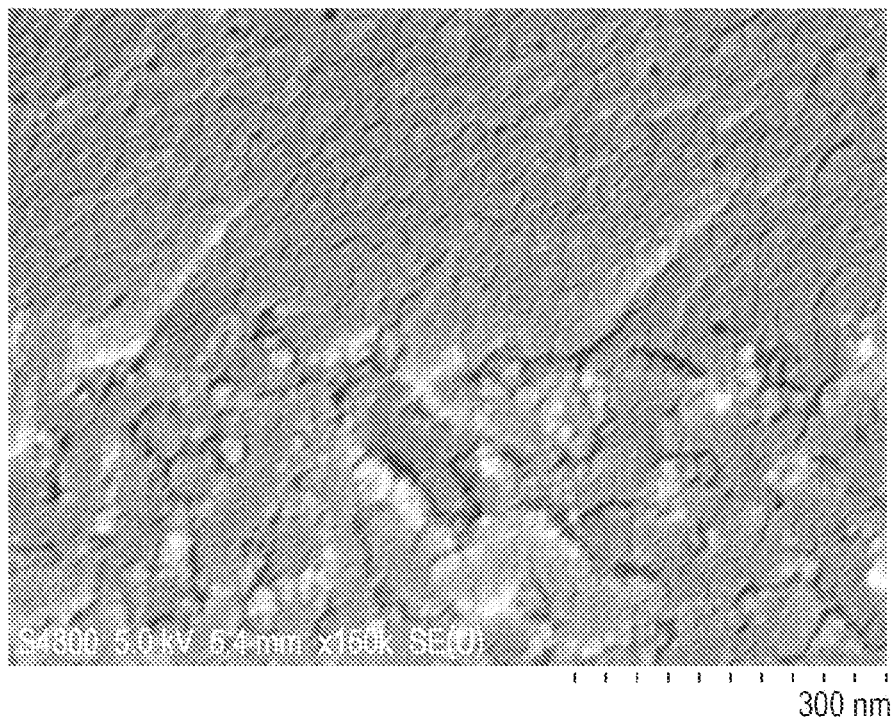
FIG. 2E is an electron micrograph of a cross section (of a portion located at a depth of 35 micrometers from the surface) of the porous glass prepared in EXAMPLE 1.
Figure 2F:
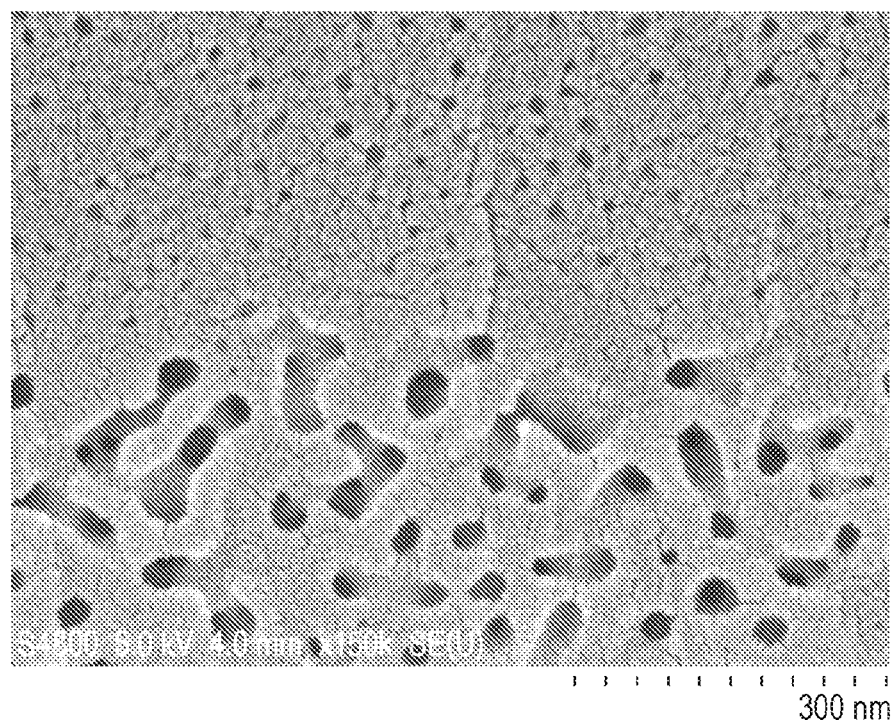
FIG. 2F is an electron micrograph of a cross section (of a portion located at a depth of 35 micrometers from the surface) of a porous glass prepared in EXAMPLE 1, the cross section being obtained by sectioning the porous glass and performing acid treatment.

FIGS. 2A to 2E illustrate the results of SEM observation of a cross section of the resulting glass piece. FIG. 2A illustrates the observation result of a portion located at a depth of about 1 micrometer from a surface. FIG. 2B illustrates the observation result of a portion located at a depth of about 5 micrometers from the surface. FIG. 2C illustrates the observation result of a portion located at a depth of about 20 micrometers from the surface. FIG. 2D illustrates the observation result of a portion located at a depth of about 30 micrometers from the surface. FIG. 2E illustrates the observation result of a portion located at a depth of about 35 micrometers from the surface. FIG. 2A demonstrates that a porous structure including ant-nest-like spinodal pores is formed. FIG. 2B demonstrates that the spinodal pores are mainly present and that some binodal pores are also present. FIGS. 2C and 2D demonstrate that a porous structure in which almost all pores are binodal pores is formed. FIG. 2E demonstrates the boundary between a region affected by the immersion in water and a region unaffected by the immersion in water. FIG. 2F illustrates a cross section of a portion corresponding to the portion illustrated in FIG. 2E, the cross section being obtained by sectioning the glass piece, immersing the sectioned glass piece in a 1 mol/L (1 N) aqueous nitric acid solution having a temperature of 80 degrees (Celsius) for 24 hours, and immersing deionized water having a temperature of 80 degrees (Celsius) for 24 hours. A comparison between FIGS. 2E and 2F demonstrates that in the portion located at a depth of about 35 micrometers from the surface, boron oxide and an alkali metal oxide were left inside the glass piece.

As described above, the surface layer of the glass had the porous structure in which both the spinodal pores and the binodal pores were present. The upper portion of the surface layer had a structure in which the spinodal pores were mainly present. The pores changed from the spinodal pores to the binodal pores at greater distances from the surface toward the inside. The lower portion of the surface layer had a structure in which the binodal pores are mainly present. That is, a gradient pore structure was formed in the depth direction.

Example 2

A glass plate produced as in EXAMPLE 1 was cut into square pieces each measuring about 1 cm by 1 cm, which served as a matrix glass. The matrix glass with a composition of $4.5Na_2O$-$19B_2O_3$-$75SiO_2$-$1.5Al_2O_3$ (% by weight) was immersed in deionized water (neutral, pH=6.9) having a temperature of 80 degrees (Celsius) for 3 hours. Then the matrix glass was subjected to heat treatment at 600 degrees (Celsius) for 50 hours.

Figure 3A:
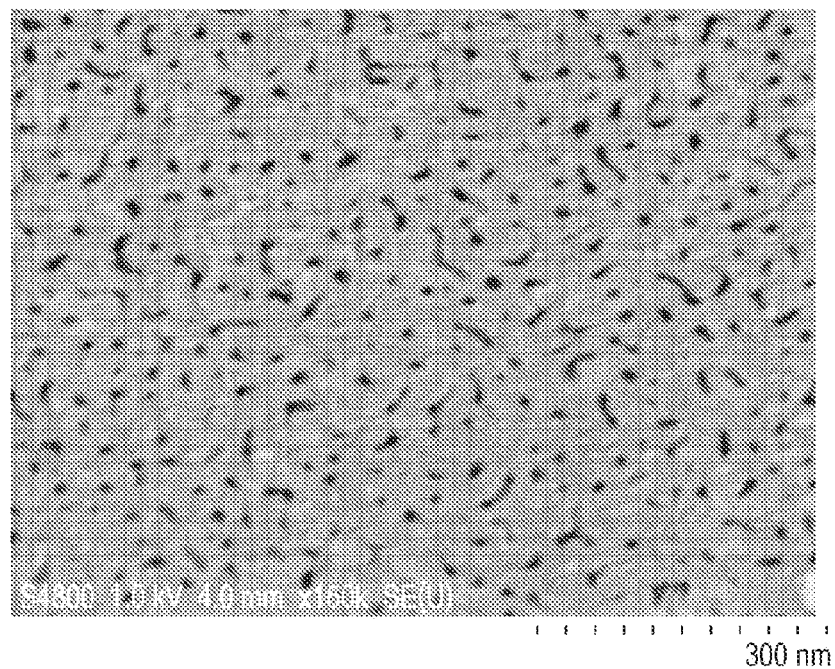
FIG. 3A is an electron micrograph of a cross section (of a portion located at a depth of 1 micrometer from a surface) of a glass prepared in EXAMPLE 2.
Figure 3B:
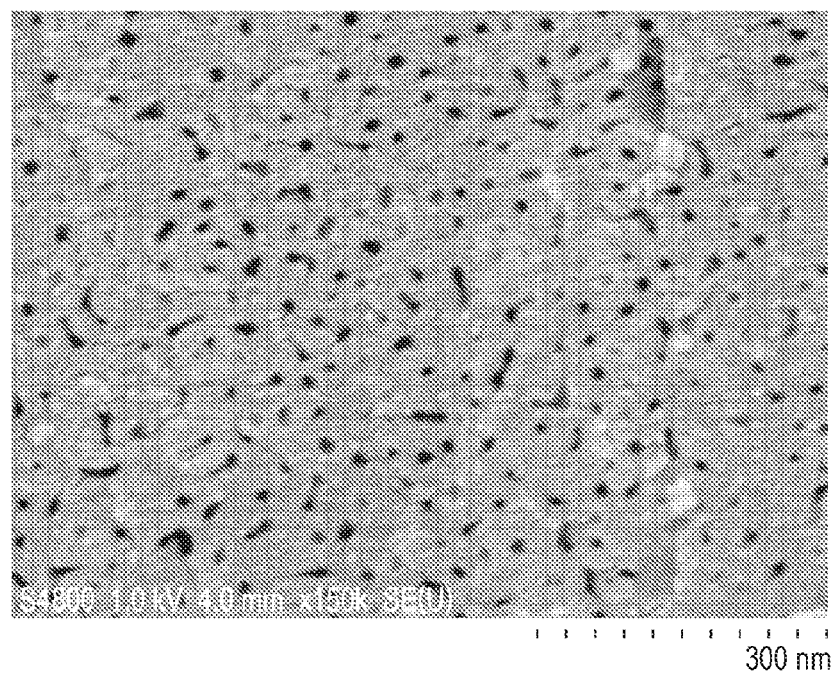
FIG. 3B is an electron micrograph of a cross section (of a portion located at a depth of 5 micrometers from the surface) of the glass prepared in EXAMPLE 2.
Figure 3C:
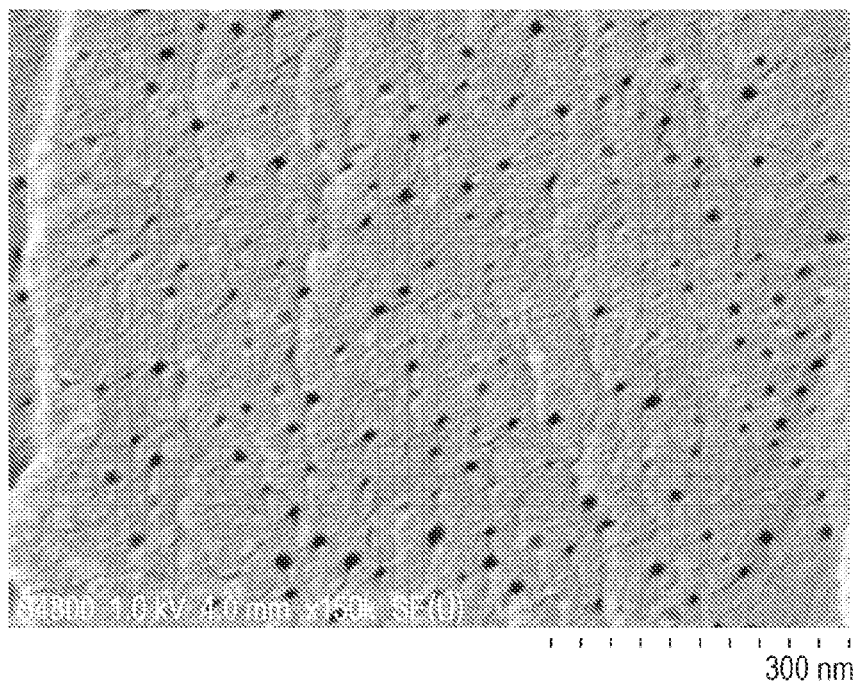
FIG. 3C is an electron micrograph of a cross section (of a portion located at a depth of 15 micrometers from the surface) of the glass prepared in EXAMPLE 2.
Figure 3D:
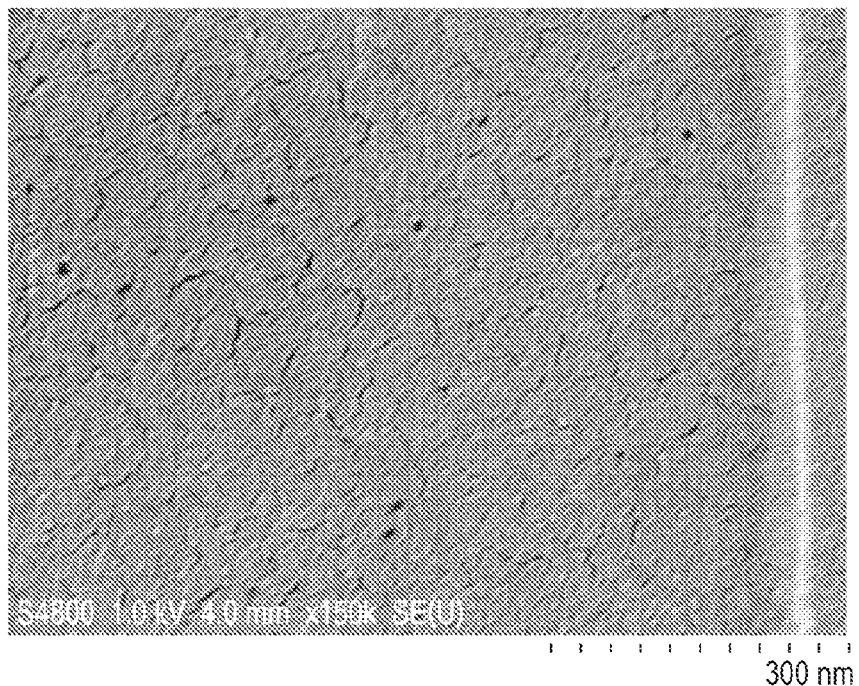
FIG. 3D is an electron micrograph of a cross section (of a portion located at a depth of 20 micrometers from the surface) of the glass prepared in EXAMPLE 2.

FIGS. 3A to 3D illustrate the results of SEM observation of a cross section of the resulting glass piece. FIG. 3A illustrates the observation result of a portion located at a depth of about 1 micrometer from a surface. FIG. 3B illustrates the observation result of a portion located at a depth of about 5 micrometers from the surface. FIG. 3C illustrates the observation result of a portion located at a depth of about 15 micrometers from the surface. FIG. 3D illustrates the observation result of a portion located at a depth of about 20 micrometers from the surface. FIG. 3A demonstrates that a porous structure including ant-nest-like spinodal pores is formed. FIG. 3B demonstrates that the spinodal pores are mainly present and that some binodal pores are also present. FIGS. 3C and 3D demonstrate that a porous structure in which almost all pores are binodal pores is formed.

Similarly to EXAMPLE 1, the surface layer of the glass had the porous structure in which both the spinodal pores and the binodal pores were present. The upper portion of the surface layer had a structure in which the spinodal pores were mainly present. The pores changed from the spinodal pores to the binodal pores at greater distances from the surface toward the inside. A gradient pore structure was formed in the depth direction. It is speculated that a basic skeleton structure was formed when the glass was immersed in water and then subjected to the heat treatment for phase separation. In particular, the upper portion of the surface layer had a low porosity compared with EXAMPLE 1. This is presumably because components in the alkali metal oxide-boron oxide-rich phase are not etched with an acid.

Evaluation of Glass Composition

A glass having the foregoing composition was immersed in water and subjected to heat treatment at 600 degrees (Celsius). A surface of the glass was analyzed by XPS. The results demonstrated that with respect to the composition of the surface layer of the glass, the surface layer had a boron content of about ⅓ of that of the inner portion of the glass and had a sodium content of about ½ of that of the inner portion of the glass. That is, the composition in the surface layer of the glass was changed.

Evaluation of Reflectance 1

The reflectance of the porous glass produced in EXAMPLE 1 was measured. The porous glass had reflectances of 1.86% at 550 nm and 2.32% at 400 nm. The porous glass produced in EXAMPLE 2 had reflectances of 2.23% at 550 nm and 2.66% at 400 nm.

Comparative Example 1

A glass plate produced as in EXAMPLE 1 was cut into square pieces each measuring about 1 cm by 1 cm, which served as a matrix glass. The matrix glass with a composition of $4.5Na_2O$-$19B_2O_3$-$75SiO_2$-$1.5Al_2O_3$ (% by weight) was subjected to heat treatment at 600 degrees (Celsius) for 50 hours. Then the matrix glass was immersed in a 1 mol/L (1 N) aqueous nitric acid solution having a temperature of 80 degrees (Celsius) for 24 hours and then immersed in deionized water (neutral, pH=6.9) having a temperature of 80 degrees (Celsius) for 24 hours.

Figure 4A:
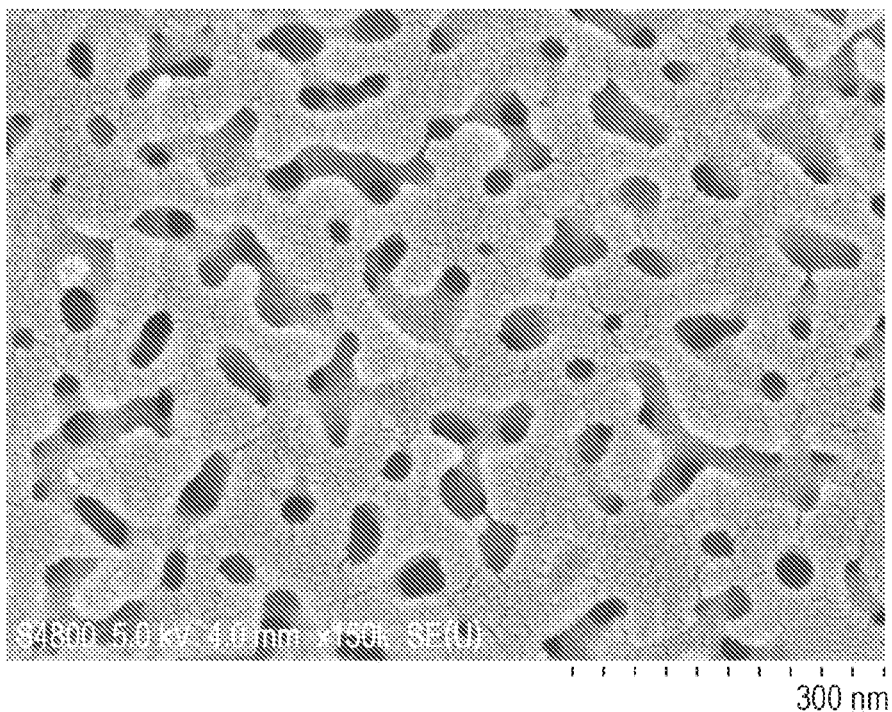
FIG. 4A is an electron micrograph of a cross section (of a portion located at a depth of 5 micrometers from a surface) of a porous glass prepared in COMPARATIVE EXAMPLE 1.
Figure 4B:
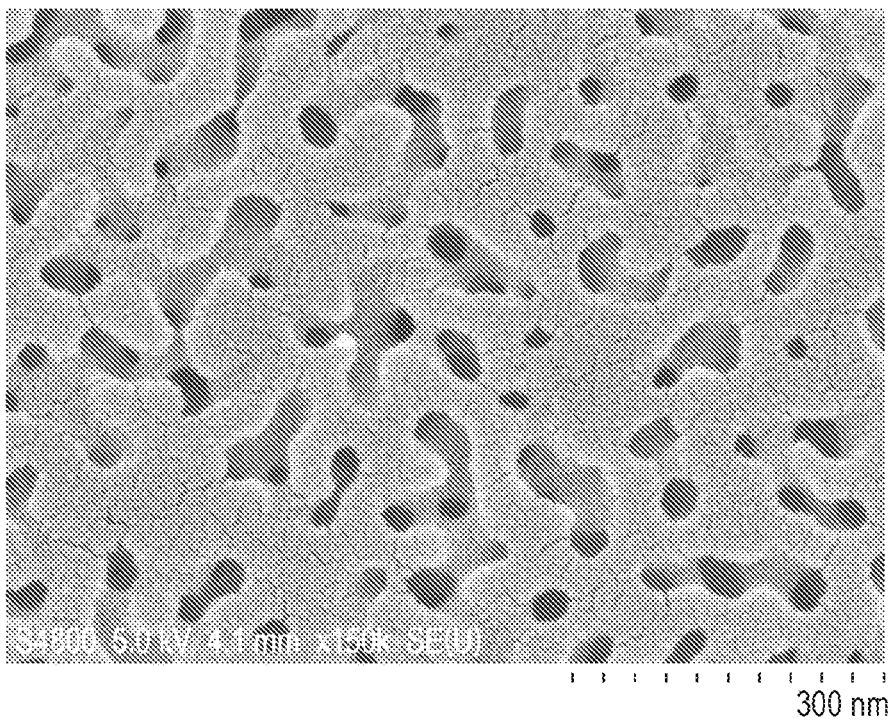
FIG. 4B is an electron micrograph of a cross section (of a portion located at a depth of 30 micrometers from the surface) of the porous glass prepared in COMPARATIVE EXAMPLE 1.

FIGS. 4A and 4B illustrate the results of electron microscope observation of a cross section of the resulting glass. FIG. 4A illustrates the observation result of a portion located at a depth of about 5 micrometers from a surface. FIG. 4B illustrates the observation result of a portion located at a depth of about 30 micrometers from the surface.

FIG. 4A demonstrates that a porous structure including ant-nest-like spinodal pores is formed and that a binodal pore was not observed. FIG. 4B also demonstrates that a porous structure including spinodal pores is formed and that a binodal pore was not observed. As described above, in the surface layer of the glass, a binodal pore was not observed, and the porous structure including spinodal pores was formed. A gradient pore structure in the depth direction was not observed.

Evaluation of Reflectance 2

The reflectance of the porous glass produced in COMPARATIVE EXAMPLE 1 was measured. The porous glass had reflectances of 1.90% at 550 nm and 3.34% at 400 nm. The results demonstrate that the reflectance in the visible region is higher than that in EXAMPLE 1 and that the wavelength dependence is not satisfactory.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-193215, filed Aug. 31, 2010, and No. 2011-161447, filed Jul. 23, 2011, which are hereby incorporated by reference herein in its entirety.

INDUSTRIAL APPLICABILITY

A phase-separated glass composition according to aspects of the present invention and a porous glass made therefrom are each a porous glass having antireflection performance improved by widely controlling the formation of a porous structure. Thus, they can be used for a significantly useful optical member in the optical field.

REFERENCE SIGNS LIST 1 porous glass
2 porous layer
3 matrix layer

The invention claimed is:

1. A porous glass comprising:
a porous layer including silica, and
a matrix layer,
wherein the porous layer is provided on the matrix layer,
wherein pores attributed to spinodal phase separation and pores attributed to binodal phase separation are formed in the porous layer, and
in the porous layer, the proportion of pores attributed to spinodal phase separation with respect to the proportion of pores attributed to binodal phase separation is reduced with increasing distance from a surface toward the inside of the porous layer,
wherein in the porous layer, the proportion of the pores attributed to spinodal phase separation with respect to the proportion of the pores attributed to binodal phase separation is reduced with increasing distance from a surface of the porous layer toward the matrix layer,
wherein the matrix layer contains silicon oxide, boron oxide and an alkali metal oxide, and
wherein an average pore size of the porous glass is in the range of 0.001 micrometers to 1 micrometer.

2. The porous glass according to claim 1,
wherein the porous glass has a thickness of 500 micrometers to 2000 micrometers, and
the porous layer has a thickness of 0.01 micrometers to 100 micrometers.

3. The porous glass according to claim 1,
wherein the porous glass contains silicon oxide, boron oxide, and an alkali metal oxide.

4. The porous glass according to claim 1, further comprising:
a base,
wherein the porous layer is provided on the base.

5. An optical member comprising:
the porous glass according to claim 1.

6. The porous glass according to claim 1,
wherein pores attributed to spinodal phase separation are formed in the matrix layer.

7. The porous glass according to claim 1,
wherein in cross-section of the porous layer, a shape of a pore attributed to spinodal phase separation is arcuate.

8. The porous glass according to claim 1,
wherein in cross-section of the porous layer, a shape of a pore attributed to spinodal phase separation is elliptic.

9. The porous glass according to claim 1,
wherein in cross-section of the porous layer, a shape of a pore attributed to binodal phase separation is substantially spherical.

10. The porous glass according to claim 1,
wherein the pores attributed to binodal phase separation are connected to each other through a tubular pore having a pore size smaller than those of the pores attributed to binodal phase separation.

11. The porous glass according to claim 1,
wherein a pore attributed to binodal phase separation is connected to a pore attributed to spinodal phase separation through a tubular pore having a pore size smaller than that of the pore attributed to binodal phase separation.

12. An image pick-up system comprising the optical member according to claim 5.

13. A projection system comprising the optical member according to claim 5.

14. A scanning optical system comprising the optical member according to claim 5.

15. A display apparatuses comprising the optical member according to claim 5.

* * * * *